US011972613B1

(12) United States Patent
Ho et al.

(10) Patent No.: US 11,972,613 B1
(45) Date of Patent: Apr. 30, 2024

(54) APPARATUS AND METHODS FOR ATMOSPHERIC CONDITION DETECTION

(71) Applicant: Zoox, Inc., Foster City, CA (US)

(72) Inventors: Holly Ho, Palo Alto, CA (US); Mohammed Umar Piracha, Union City, CA (US); Alejandro Ruiz, Newark, CA (US); Nehemia Girma Terefe, Foster City, CA (US)

(73) Assignee: Zoox, Inc., Foster City, CA (US)

(\*) Notice: Subject to any disclaimer, the term of this patent is extended or adjusted under 35 U.S.C. 154(b) by 0 days.

(21) Appl. No.: 18/050,851

(22) Filed: Oct. 28, 2022

(51) Int. Cl.
| *G06V 20/56* | (2022.01) |
| *G01J 5/00* | (2022.01) |
| *G01J 5/08* | (2022.01) |
| *G01S 13/931* | (2020.01) |
| *G06V 10/56* | (2022.01) |
| *G06V 10/70* | (2022.01) |
| *H04N 5/33* | (2023.01) |

(52) U.S. Cl.
CPC ............ *G06V 20/56* (2022.01); *G01J 5/0859* (2013.01); *G06V 10/56* (2022.01); *G06V 10/70* (2022.01); *H04N 5/33* (2013.01); *G01J 2005/0077* (2013.01); *G01S 2013/9322* (2020.01)

(58) Field of Classification Search
None
See application file for complete search history.

(56) References Cited

U.S. PATENT DOCUMENTS

| 5,324,113 | A  | * | 6/1994  | Ingram, Jr. ............. | G01J 5/007 |
|           |    |   |         |                          | 374/124    |
| 10,508,952| B1 | * | 12/2019 | Rennó ................... | G01J 3/2823|
| 10,535,138| B2 |   | 1/2020  | Pfeiffer                 |            |
| 10,819,923| B1 | * | 10/2020 | McCauley ............. | H04N 23/11 |
| 11,001,231| B1 | * | 5/2021  | Hedman ............... | B60S 1/0844|
| 11,327,499| B2 | * | 5/2022  | Ueda .................. | G06V 20/56 |
| 2006/0114318 | A1 | * | 6/2006 | Saka .................... | H04N 17/002|
|           |    |   |         |                          | 348/61     |
| 2009/0021581 | A1 | * | 1/2009 | Sun ..................... | G06V 20/584|
|           |    |   |         |                          | 348/148    |
| 2013/0327966 | A1 | * | 12/2013| Fidler ................... | G02B 30/35 |
|           |    |   |         |                          | 250/578.1  |
| 2014/0233805 | A1 | * | 8/2014 | Faber ................... | G01W 1/00  |
|           |    |   |         |                          | 382/104    |
| 2017/0069069 | A1 | * | 3/2017 | Winzell ................ | G06T 5/94  |
| 2018/0370433 | A1 | * | 12/2018| Huang .................. | H04N 5/272 |
| 2019/0180458 | A1 | * | 6/2019 | Ruzanski ............. | G01B 11/303|
| 2019/0249957 | A1 | * | 8/2019 | Ando ................... | F41G 7/34  |

(Continued)

FOREIGN PATENT DOCUMENTS

| CN | 112949510 A | * | 6/2021 | |
| CN | 114641800 A | * | 6/2022 | ......... G06K 9/00369 |

*Primary Examiner* — Stefan Gadomski
(74) *Attorney, Agent, or Firm* — EIP US LLP

(57) ABSTRACT

Apparatus and methods for determining an atmospheric condition in an environment of a vehicle are described herein. A long wave infrared camera may be used to produce thermal image data from a field of view of the LWIR camera that includes an unknown atmospheric condition. The thermal image data may include a characteristic that may be compared to characteristic of thermal image data for a known atmospheric condition. A result of the comparison may be used to make a determination related to the unknown atmospheric condition which may be used in controlling the vehicle.

20 Claims, 6 Drawing Sheets

(56) References Cited

U.S. PATENT DOCUMENTS

| | | | |
|---|---|---|---|
| 2020/0133295 A1* | 4/2020 | Indrakanti | G06V 10/803 |
| 2020/0175659 A1* | 6/2020 | Rakshit | G06T 5/92 |
| 2020/0207375 A1* | 7/2020 | Mehta | G06V 20/56 |
| 2020/0310753 A1* | 10/2020 | Radu | G05D 1/0088 |
| 2021/0034059 A1* | 2/2021 | Nagata | B60W 60/0015 |
| 2021/0053483 A1* | 2/2021 | Takeyasu | G06V 40/103 |
| 2021/0080966 A1* | 3/2021 | Tran | B60W 30/18163 |
| 2021/0108966 A1* | 4/2021 | Kuepper | G01J 5/0025 |
| 2021/0149407 A1* | 5/2021 | Janakiraman | B60W 50/045 |
| 2021/0150772 A1* | 5/2021 | Yasui | G06T 11/00 |
| 2021/0155261 A1* | 5/2021 | Caccia Dominioni | B60Q 9/00 |
| 2021/0405642 A1* | 12/2021 | Danford | B62D 15/0265 |
| 2022/0111858 A1* | 4/2022 | Ran | B60W 60/001 |
| 2022/0172390 A1* | 6/2022 | Redford | G06T 7/593 |
| 2022/0182855 A1* | 6/2022 | Yehliu | G08G 1/096783 |
| 2022/0185308 A1* | 6/2022 | Baek | B60W 40/02 |
| 2022/0187448 A1* | 6/2022 | Shand | G01S 13/931 |
| 2022/0214222 A1* | 7/2022 | Tauber | G06T 7/593 |
| 2022/0227364 A1* | 7/2022 | Chase | B60W 50/14 |
| 2022/0230018 A1* | 7/2022 | Kundu | G06V 10/809 |
| 2022/0337810 A1* | 10/2022 | Tauber | G01J 5/0887 |
| 2022/0371614 A1* | 11/2022 | Gyllenhammar | G07C 5/008 |
| 2023/0077516 A1* | 3/2023 | Bianconcini | G06V 10/764 382/104 |
| 2023/0134302 A1* | 5/2023 | Herman | G01J 4/04 382/104 |
| 2023/0138981 A1* | 5/2023 | Willoughby | G06V 20/582 701/26 |
| 2023/0150529 A1* | 5/2023 | Stenson | G06N 3/0475 701/23 |
| 2023/0175852 A1* | 6/2023 | Shambik | G06V 20/588 701/28 |
| 2023/0199280 A1* | 6/2023 | Takehara | H04N 7/183 348/164 |
| 2023/0237785 A1* | 7/2023 | Gowda | G06V 10/7715 382/157 |
| 2023/0249712 A1* | 8/2023 | Chen | G06V 20/58 701/26 |
| 2023/0260334 A1* | 8/2023 | Di Francesco | G07C 5/0866 701/1 |
| 2023/0281871 A1* | 9/2023 | Aluru | G06V 20/56 382/103 |
| 2023/0320274 A1* | 10/2023 | Vandike | G06V 20/56 701/50 |

* cited by examiner

US 11,972,613 B1

APPARATUS AND METHODS FOR ATMOSPHERIC CONDITION DETECTION

BACKGROUND

Vehicles, such as autonomous vehicles and vehicles having driver assist functions may include one or more sensor system to determine information about objects in the environment surrounding the vehicle. Some of the information from these sensors may be used to control or assist with navigation of the vehicle. This navigation related information may relate to the objects position, trajectory, speed and other information used to safely navigate the vehicle environment.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
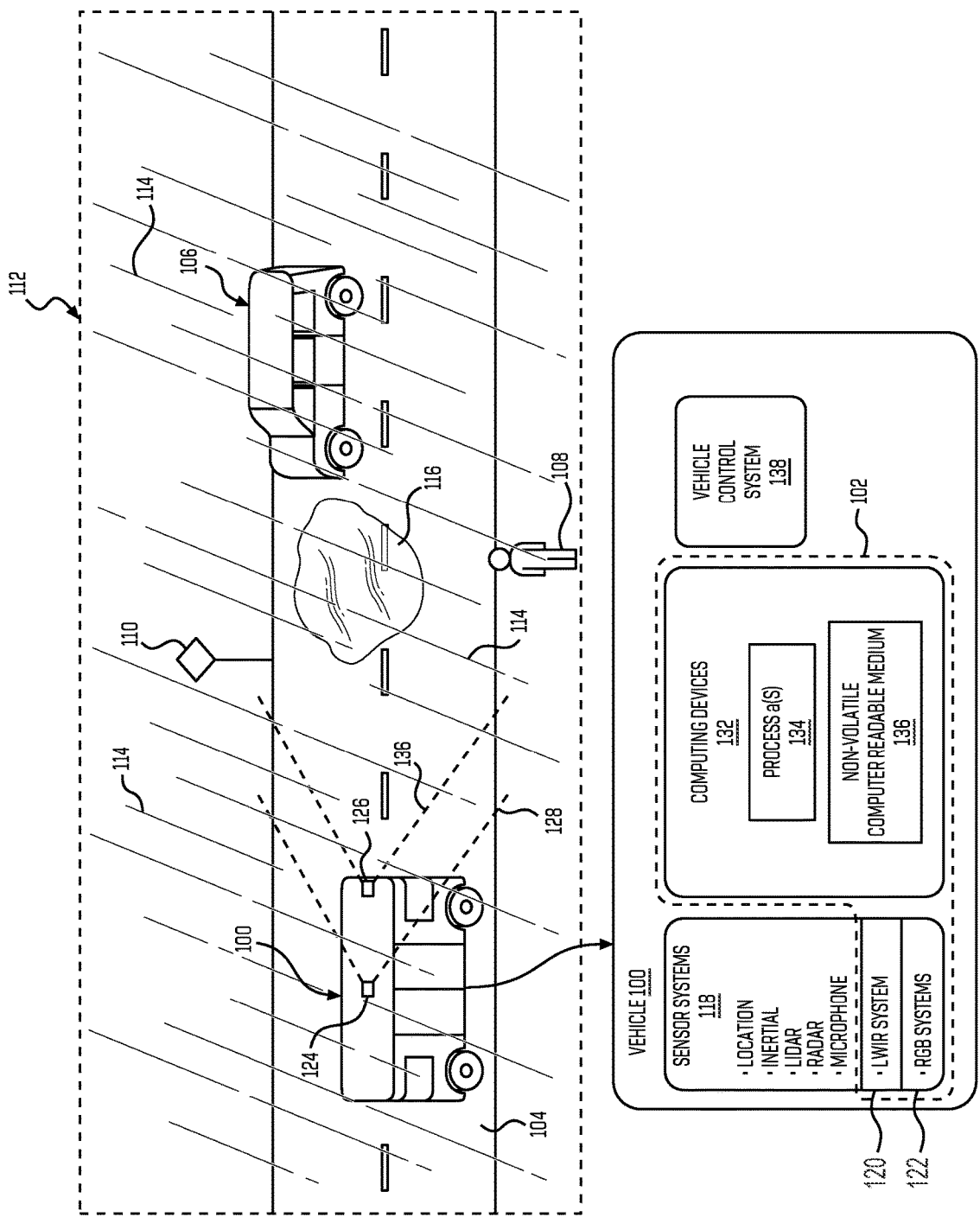
FIG. 1 depicts an example of a vehicle on a road and in an environment with an atmospheric condition and objects, according to at least one example.

Techniques described herein are directed to detection of atmospheric conditions in the environment around a vehicle and may have particular application in autonomous vehicles (AV) and vehicles having driver assist controls such as electronic stability control (ESC). Vehicles may include sensors for collecting data about the surrounding environment. The collected data may assist the vehicle in navigating along a route which may have various objects that are stationary and/or mobile. These stationary (or static) objects may include for example: buildings, road signs, fences, parked cars and trees; and mobile (or dynamic) objects may include for example: people, animals, bicycles and other vehicles. In some examples, characteristics of data from these sensors may be used to determine atmospheric conditions around the vehicle, which may then be used in controlling the vehicle.

Vehicles need to avoid objects in order for the vehicle to safely operate along the route. To accomplish this, the vehicle may include one or more sensor systems that detect various aspects of the environment surrounding the vehicle, including information related to the objects and information related to atmospheric conditions in the environment of the vehicle. Of course, though discussed as atmospheric conditions herein, any environmental condition is contemplated. The atmospheric conditions may include, for example, atmospheric conditions such as temperature, humidity, wind, fog and precipitation, and may include, for example, other atmospheric conditions such as dust and pollution. These sensor systems may include, for example, lidar, visible wave-length cameras (such as Red Green Blue RGB cameras), radar, sound based sensors (e.g., microphones, ultrasonics, etc.), infrared sensors, and others.

Determining atmospheric conditions may be used for safety purposes. For example, when a vehicle determines that there is snow, vehicle systems may slow the speed of the vehicle in anticipation of a reduction in available traction at the wheels. Also, the vehicle systems may anticipate a reduction in sensor range when certain atmospheric conditions are determined to exist. The vehicle may also take actions to deal with the particular condition, such as turning on windshield wipers during rain or snow, or controlling a sensor cleaning system to be activated, as examples.

Some vehicles may have a long-wave infrared sensor (LWIR) system with one or more LWIR cameras, each having a LWIR sensor. Infrared sensors, and in particular LWIR sensors may be used to sense objects in a variety of conditions in which other sensors may not be as well suited. For example, LWIR sensors may provide better information about objects in the environment than a visual camera in conditions such as night time, rain, snow, fog, dust and/or other conditions.

LWIR sensors may provide data related to the infrared radiation emitted from the objects, which may be referred to as thermal radiation or heat. LWIR sensors may collect radiation in the 8 μm to about 15 μm wavelength band. The wavelengths emitted from the objects in the LWIR band are dependent on temperature. Relatively higher temperatures emit relatively shorter wavelength infrared radiation and relatively lower temperatures emit relatively longer wavelength infrared radiation.

LWIR cameras may include optics which may focus the radiation from the objects onto the LWIR sensor. The LWIR sensor may receive the IR radiation from within a field of view of the LWIR camera which may be related to characteristics of the camera optics and the LWIR sensor may produce thermal image data which may or may not be further processed by the LWIR camera. The LWIR camera may produce a stream of the thermal image data that represents the LWIR radiation from a scene in the field of view of the LWIR camera over a period of time. The LWIR camera may also produce one or more individual thermal images of the thermal image data that each represent the LWIR radiation in a scene in the field of view of the LWIR camera at a given time. The scene may be or include all or some of the objects in the field of view at a given time.

LWIR systems having one or more LWIR sensors may represent the thermal image data in the form of a thermal image. In some examples, the thermal image data at a particular time may be used to produce a thermal image for that particular time. In some examples, the thermal image may be a two-dimensional representation of the scene in the field of view of the LWIR camera at a given time. In some instances, the live stream of thermal image data may be a series of thermal images that represent the scene over a period of time. In a thermal image, the different wavelengths may be represented by different colors in a two-dimensional view of the scene. In some thermal images, the highest temperature areas may be represented by a white, yellow or red, while lower temperature areas may be represented by blue, green or purple.

Objects which may be commonly encountered by a vehicle with an LWIR system may have a thermal image or other characteristic that may be recognized by the system. For example, the LWIR system may recognize an object as a person by certain shapes and/or by thermal image colors in the persons face, hands and/or other parts of the person since people may typically have similar skin temperatures and generally similar shapes. As another example, combustion engine vehicles may be recognized by such a system because of shapes and/or thermal image colors of the vehicles engine and/or exhaust. In some implementations, vehicles may utilize a machine learning system to categorize objects based, at least in part on thermal images. The categorization may use the colors and/or shapes of the thermal images, and the machine learning system may utilize a model that may be based at least in part on training data having the thermal image colors and shapes for known objects within certain categories.

A thermal image of an object that is determined to be within a certain category may have characteristics that are known to be associated with those types of objects in a known environment. As an example, a thermal image of a person may have certain colors associated with the temperature of bare skin, and other colors associated with skin that is covered by clothing during a clear day or night. A known characteristic may include a contrast between the bare skin and the covered skin of the person in the colors in the thermal image that includes the person in a known atmospheric condition.

In another example, a thermal image of a vehicle in a known environment of the vehicle with the LWIR system may exhibit a certain color or set of colors in the area of the vehicle that has a combustion engine, tail pipe, or other part of the vehicle that may be relatively hotter than other parts of the vehicle. Other areas of the vehicle, such as a wheel, door, or other part, may exhibit another color or set of colors which may represent a relatively cooler part of the vehicle. The known or expected characteristic may be, for example, a difference in certain aspects of the color, such as a difference in the colors in the thermal image, the relative brightness of the colors, color temperature, contrast between the different colors, and/or other aspects of the colors relative to one another in the thermal image for the object in a known atmospheric condition. In some examples, brighter colors may represent higher temperatures and shorter wavelengths and dull colors may represent lower temperatures and longer wavelengths.

In some implementations, a vehicle may have a sensor array that includes a LWIR sensor. The LWIR sensor may produce thermal image data related to an object in an environment of the vehicle. The thermal image data may include a characteristic that is related to an unknown atmospheric condition in the environment of the vehicle. The characteristic of the thermal image data for the object in the unknown atmospheric condition may be compared to a characteristic of thermal image data for another object in the same category in a known atmospheric condition. Comparing the characteristic related to the known atmospheric condition to the characteristic related to the unknown atmospheric condition may be used in determining if the unknown atmospheric condition is the same or different than the known atmospheric condition.

For example, a characteristic of the thermal image for the known atmospheric condition may be a contrast between different colors for the thermal image of a person during a clear day. This may be compared to a characteristic of a thermal image that is a contrast between different colors for the thermal image of a person for an unknown atmospheric condition. In some examples, the color contrast of the person during the clear day may be greater than the color contrast of the person during a day with precipitation, as the wavelength may be lower based on, for example, cooler skin temperatures, absorption of photons by water molecules, etc. In some examples, the colors of the thermal image of the object may be more homogeneous when there are relatively more precipitation in the air than the colors of a thermal image of the object when there are relatively less precipitation in the air. In some examples, the thermal image characteristic may be related to the entire image and may include one or more objects in the image. In some examples, the thermal image characteristic may be related to a single object in the image, or a segment of the image.

A confidence level may be generated that is based at least in part on the comparison of the characteristic related to the unknown atmospheric condition, and the characteristic related to the known atmospheric condition. The confidence level may be related to the probability that the unknown atmospheric condition is a particular atmospheric condition. For example, the confidence level may be relatively high when the contrast characteristic of a first thermal image data for an unknown atmospheric condition is similar to a contrast characteristic of a second thermal image data for a known atmospheric condition. In this situation, the confidence level may be relatively high that the unknown atmospheric condition is the same as the known atmospheric condition. Conversely, the confidence level may be relatively low when the contrast characteristic of the first thermal image data for an unknown atmospheric condition is different than the contrast characteristic of the second thermal image for a known atmospheric condition. In this situation, the confidence level may be relatively low that the unknown atmospheric condition is the same as the known atmospheric condition.

As another example, the confidence level may be greater than 50% that the unknown atmospheric condition is rain when the contrast of the first thermal image data for an unknown atmospheric condition is less than the contrast of a second thermal image data for an atmospheric condition that is known to be a clear day. In some examples, the characteristics of the thermal image data may be represented by values which may be used for comparison to generate the confidence level. For example, a relatively higher value number may represent a relatively higher contrast, while a relatively lower value number may represent a relatively lower contrast; or a relatively lower value number may represent a relatively higher contrast, while a relatively higher value number may represent a relatively lower contrast. In some examples, the contrast comparison may involve an entire field of view of the thermal image sensor. In some examples, the contrast comparison may involve a segment of the field of view of the thermal image sensor. In some examples, a relatively higher confidence level may be generated when a first value is lower than a second value, and a relatively lower confidence level may be generated when the first value is higher or the same as the second value. In some examples, the confidence level is higher when the probability of the unknown atmospheric condition is more likely to be the particular atmospheric condition, and the confidence level is lower when the probability of the unknown atmospheric condition is less likely to be the particular atmospheric condition.

The confidence level may be used by a vehicle control system to control one or more aspects of the vehicle. For example, if the confidence level is high that the atmospheric condition is rain, may be used in the vehicle system that controls the braking, windshield wipers, sensor cleaning systems, drive systems or other systems.

In another example, the thermal image data characteristic may relate to reflections found in the thermal image data, which may also be referred to as mirrored image data. In some examples, the thermal image data may include thermal representations of mirror images of shapes. In some instances, these mirror images characteristics may be indicative of a wet surface, such as a roadway or sidewalk. While a hot engine may emit infrared radiation that is represented in a thermal image as one or more color, a wet surface may reflect similar frequency infrared radiation from the hot engine which may reach the IR detector and which may show on the thermal image as a mirror image of the engine in the same or similar colors.

By comparing the characteristics of a thermal image for a known atmospheric condition, such as a thermal image for a dry environment, with the characteristics of a thermal image with an unknown atmospheric condition, such as one in which the thermal image includes thermal mirror images, the unknown atmospheric condition may be determined to be raining, wet, or ice on a road. In some examples, a comparison may be made for an amount of mirrored image data in one thermal image data as compared to an amount of mirrored image data in other thermal image data. In an example, a first thermal image data includes mirrored image data for an unknown atmospheric condition and a second thermal image data does not include mirrored image data for a known atmospheric condition that does not include precipitation, and a confidence level may indicate a relatively higher probability that the unknown atmospheric condition is precipitation than a probability that an unknown atmospheric condition is not precipitation. In some examples, thermal image data from an unknown atmospheric condition may not need to be compared with thermal image data from a known atmospheric condition. For example, thermal image data that includes mirror images may be indicative of current or recent precipitation.

In some examples, the thermal image data characteristic may be based, at least in part, on more than one object in a thermal image, or on the whole thermal image. For example, the thermal image may include data for multiple vehicles, or multiple people or combinations of people and vehicles. As another example, the thermal image may include characteristics related to contrast and mirror image characteristics.

In some implementations, a sensor array of a vehicle may include one or more Red-Green-Blue (RGB) camera. In some examples, the RGB camera may have a field of view that includes at least part of the field of view of the LWIR camera. The RGB camera may produce RGB image data that may include one or more RGB image data characteristic that may be indicative of an atmospheric condition in the environment of the vehicle. In some examples, the RGB image data characteristic may indicate that the atmospheric condition includes precipitation, and the RGB image data may include one or more RGB image data characteristics which indicate that there is water on the RGB camera lens, which may be indicative of rain. Examples of techniques for detecting rain using a camera can be found, for example, in U.S. Pat. No. 11,176,426, filed Jun. 18, 2018, and titled "Sensor Obstruction Detection And Mitigation Using Vibration and/or Heat", the content of which are incorporated by reference herein, in their entirety for all purposes. In some examples, the RGB image data characteristic may relate to a change in intensity, contrast or other aspects of the colors of the RGB image data that may be compared with color characteristics for RGB image data for known atmospheric conditions.

In some implementations, the vehicle systems may include or utilize machine learning when determining a confidence level that an unknown atmospheric condition is a particular atmospheric condition, for controlling the vehicle system based on the confidence level and/or for other purposes. In some examples, thermal image data characteristics of one or more objects in an environment with a known atmospheric condition may be identified using a machine learning model that is based at least in part on training data that includes the one or more objects and the known atmospheric condition. The machine learning model may include thermal image data for different categories of objects, and the vehicle systems may use machine learning to identify the category of an object in thermal image data from the LWIR sensor and/or RGB camera, and may use machine learning for the categorized object to determine one or more expected characteristics in the image data. In some examples, the machine learning model may be used to recognize characteristics in image data related to changes in expected characteristics of objects to determine a confidence level. In some examples, the characteristic may be the inclusion of objects, such as umbrellas as an indication of precipitation. In some examples, the characteristic may relate to changes in thermal image data that may indicate that people are wearing coats or other garments that may block infrared radiation from their skin.

In some examples, the machine learning system may include training machine learning models to recognize contrasts in image data and/or reductions in contrast. The machine learning models may be trained to recognize that reductions in contrast may be indicative of precipitation, such as rain, in LWIR image data and/or RGB image data. Results from the machine learning models may be used when generating confidence level regarding determination of whether an unknown atmospheric condition is a particular atmospheric condition. In some examples, the machine learning models may be trained to recognize reflections in the image data.

FIG. 1 depicts an example which involves a vehicle 100 having an atmospheric condition detection system 102 travelling on a road 104 along with an object that is a combustion engine vehicle 106. Another object, a person 108 is standing next to the road 104, and an object, a sign 110 is on an opposite side of the road 104 from the person 108. The vehicle 100, the road 104, the vehicle 106, the person 108 and the sign 110 are shown in an environment 112 that is experiencing an atmospheric condition 114, which is in this example is rain, some of which has accumulated in a puddle 116.

In some instances, the vehicle 100 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 100 may be a fully or partially autonomous vehicle having any other level or classification. More-over, in some instances, the techniques described herein may be usable by non-autonomous vehicles as well.

The vehicle 100 may operate on a route that may include the road 104 to transport passengers and the vehicle 100 may need to avoid objects along the route which may include moving objects, such as vehicle 106, person 108, and stationary objects such as sign 110. To assist the vehicle 100 in these tasks, the vehicle 100 may receive sensor data from one or more sensor system 118 (sensor system(s)) which may include location, inertial, LIDAR, Radar, microphone sensors as well as one or more LWIR system 120 and RGB system 122. The system 102 may include the LWIR system 120 and may also include the RGB system 122. The LWIR system 120 may include one or more LWIR camera 124 and the RGB system 122 may include one or more RGB camera 126. The LWIR camera 124 may have a field of view 128, which in this example, includes the vehicle 106, the person 108, the sign 110, and a portion of the road 104. The RGB camera 126 may have a field of view 130 that also covers these objects 104, 106, 108, and 110.

The system 102 may include one or more computing device 132 which may each include one or more processor 134, and may include non-transitory computer readable medium 136 which may store instructions that may be executed by the one or more processor 134.

As the vehicle 100 travels on the road 104 the sensor system(s) 118 may detect various objects in proximity to the vehicle 100 which must be avoided. The system 102, including the LWIR system 120 may detect conditions of the environment 112, which may provide information that can be used in one or more vehicle control systems 138 that operate the vehicle 100, for example a drive system, a steering system, a traction control system, and/or other systems.

Figure 2:
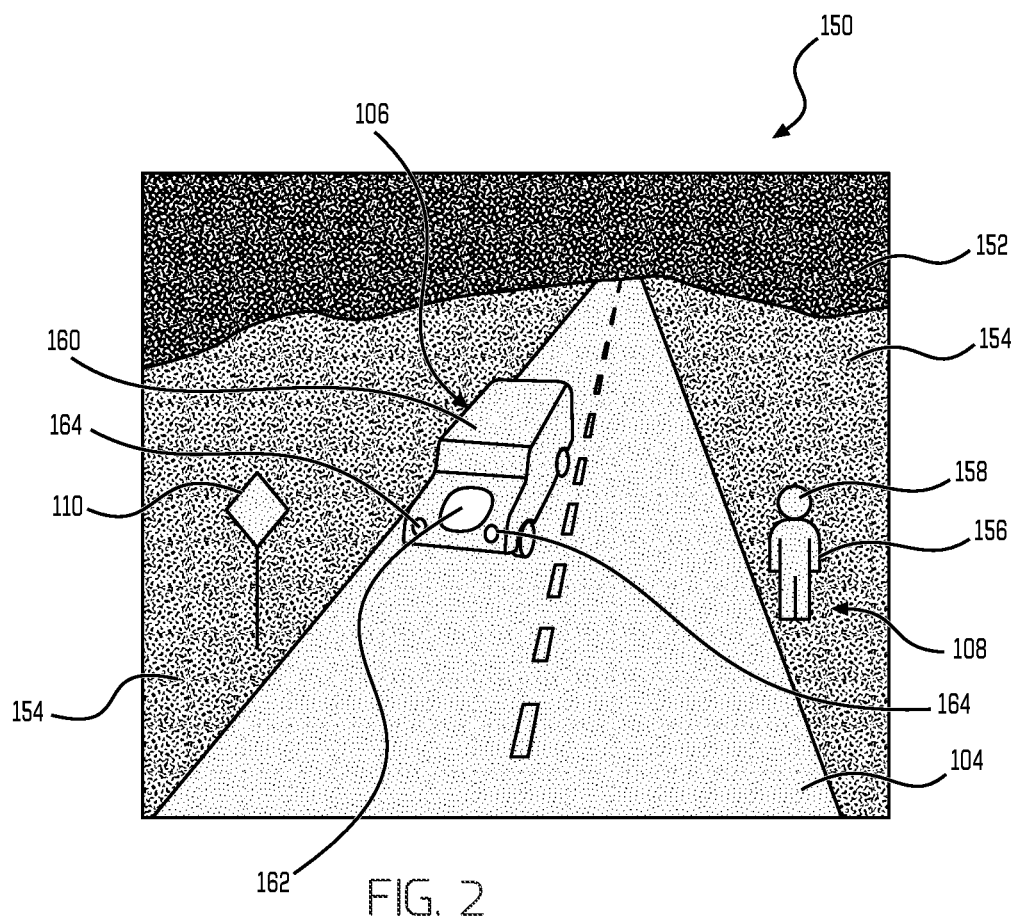
FIG. 2 is a depiction of an example of a thermal image which may be produced or used by a vehicle system of the vehicle shown in FIG. 1 using a long wave infrared camera, according to at least one example.

FIG. 2 is a depiction of a thermal image 150 which may be produced by the system 102 using the LWIR camera 124. In this example, the thermal image 150 represents the field of view 128 shown in FIG. 1 taken when there is no precipitation and the road 104 is dry. The thermal image data of the thermal image 150 represents the sky 152 using a dark color; a road side 154 and the body 156 of the person 108 is represented by a medium color, the head 158 of the person 108, a passenger compartment 160 of the vehicle 106, and the sign 110 are represented by a light color, and the hood 162 of the vehicle 106 are represented by a very light color. As can be seen by thermal image 150, when the atmosphere is clear of particles and/or precipitation, there is a relatively large contrast between objects or areas of objects that are cool and those that are hot. For example, the sky 152 may show as a cool temperature, which may be represented by a relatively dark color, while the hood of the vehicle 106 may show as hot and may be represented by a relatively bright color. In some examples, thermal image 150 may represent a second thermal image data that includes a second thermal image data characteristic for a known atmospheric condition. In some examples, thermal image 150 may represent a first thermal image data that includes a first thermal image data characteristic for an unknown atmospheric condition.

Figure 3:
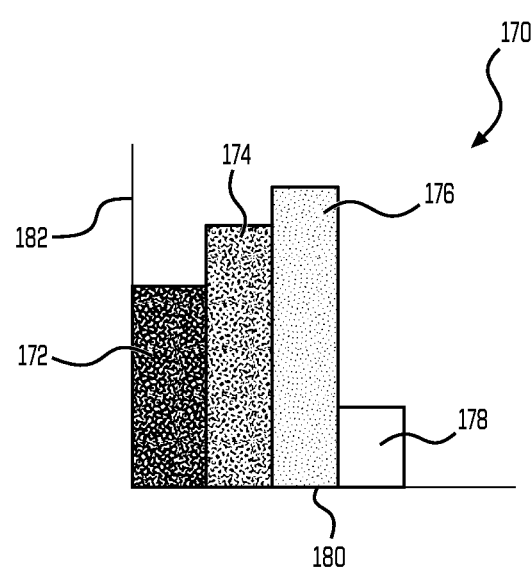
FIG. 3 is a depiction of a histogram of the thermal image shown in FIG. 2, according to at least one example.

FIG. 3 is a depiction of a histogram 170 of the thermal image 150 shown in FIG. 2. Histogram 170 shows a graphical representation of amounts of colors in thermal image 150 starting from the left with dark colors 172, moving to the right along an X-axis 180 to medium colors 174, light colors 176, and then bright colors 178. Each of the bars 172, 174, 176, and 178 may represent a range of infrared radiation frequencies, and a Y-axis 182 represents the amount of those frequencies found in the thermal image 150. In some examples, only a portion or segment of the thermal image 150 may be used, such as the sky 152, all or part of the road 104, all or part of the vehicle 106, all or part of the person 108, and/or other parts of the thermal image 150.

Figure 4:
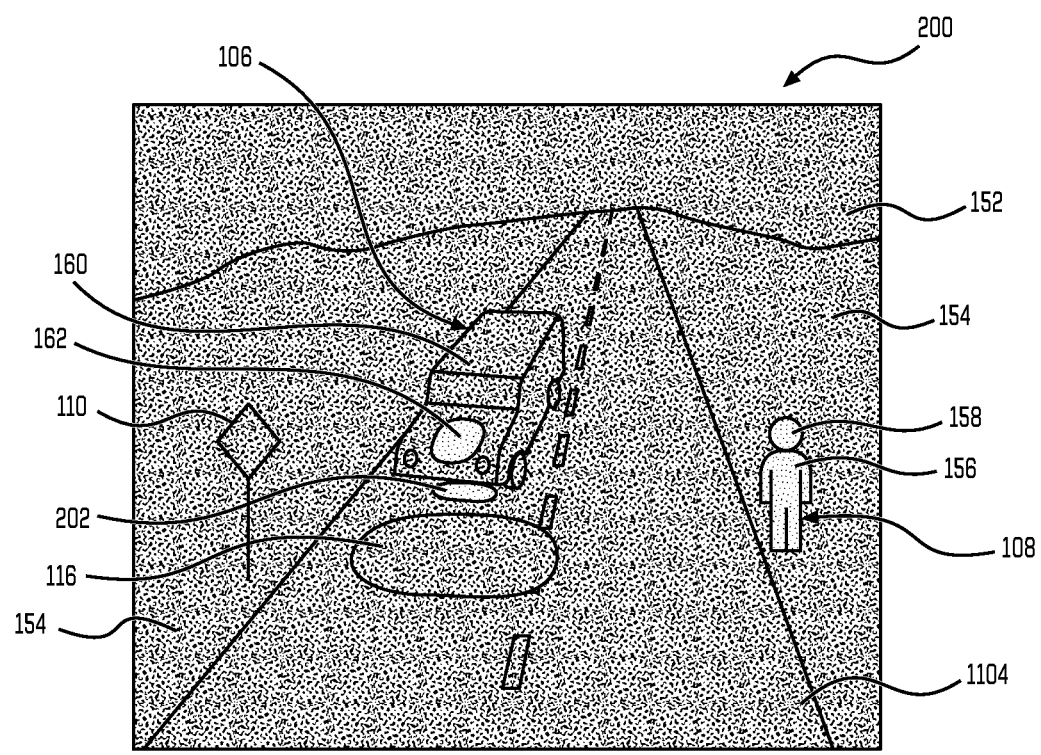
FIG. 4 is a depiction of another example of a thermal image which may be produced or used by a vehicle system of the vehicle shown in FIG. 1, using a long wave infrared camera, according to at least one example.

FIG. 4 is a depiction of a thermal image 200 which may be produced by the system 102 using the LWIR camera 124. In some examples, thermal image 200 may be produced during operation of the vehicle 100. In this example, the thermal image 200 represents the field of view 128 shown in FIG. 1 taken when the atmospheric condition includes precipitation and the road 104 is wet. The thermal image data of the thermal image 200 represents the sky 152, road side 154, road 104, and the passenger compartment 160 of the vehicle 106 as medium color; the head 158 and the body 156 of the person 108 as a light color. The puddle 116, the hood 162 and a ghost image reflection 202 of the heat from the engine of the vehicle 106 off of the wet road may be represented as a light color. As can be seen by thermal image 200, when the atmospheric condition is precipitation, there is a relatively smaller contrast between objects or areas of objects that are cool and those that are hot. For example, the sky 152 may show as a medium color when there is no precipitation, while the hood of the vehicle 106 may be represented by a light color. In some examples, the thermal image 200 may represent a first thermal image data that includes a first thermal image data characteristic for an unknown atmospheric condition. In some examples, the thermal image 200 may represent a second thermal image data that includes a second thermal image data characteristic for a known atmospheric condition.

In some examples, a person's clothing, such as rain coats that may insulate the body temperature may change the appearance of the person and may be a thermal image characteristic which may be used to identify when there is precipitation in the environment. In another example, the thermal image characteristic may involve objects such as umbrellas. In some examples, the thermal image characteristic may involve a change in a thermal appearance of a person by covering a portion of the person. In some examples, a machine learning model may be trained using what a person may look like based on temperature in different atmospheric conditions.

Figure 5:
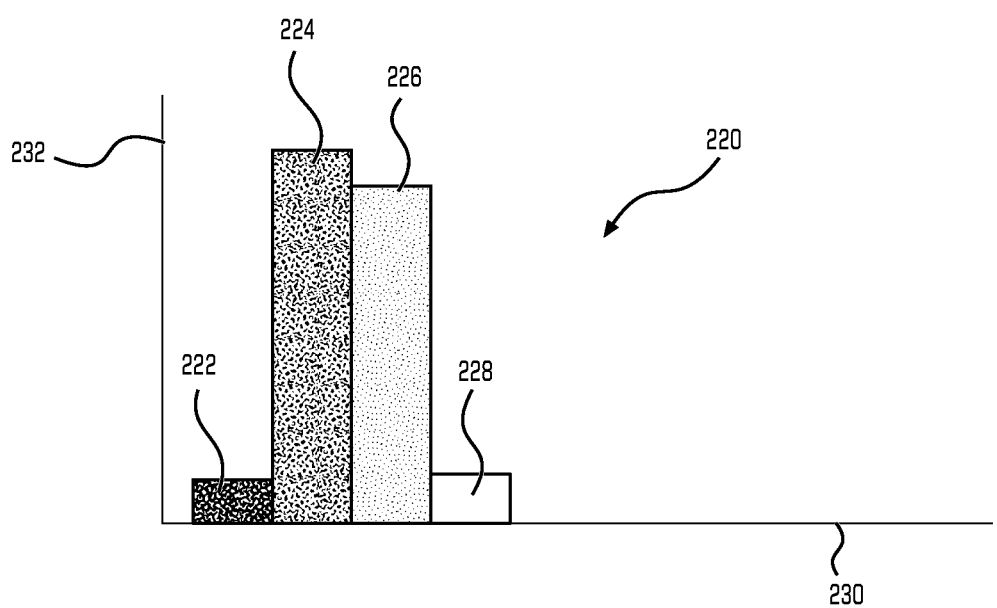
FIG. 5 is a depiction of a histogram of the thermal image shown in FIG. 4, according to at least one example.

FIG. 5 is a depiction of a histogram 220 of the thermal image 200 shown in FIG. 4. Histogram 220 shows a graphical representation of amounts of colors in thermal image 200 starting from the left with dark colors 222, moving to the right along an X-axis 230 to medium colors 224, light colors 226, and then bright colors 228. Each of the bars 222, 224, 226, and 228 may represent a range of infrared radiation frequencies, and a Y-axis 232 represents the amount of those frequencies found in the thermal image 200. As shown by histogram 220 there is relatively less contrast in the thermal image 200 that there is in the thermal image 150 represented by histogram 170. This is represented in the histogram 220 by lower amounts of dark colors 222 and bright colors 228, and more areas that produce medium colors 224 and light colors 226. In other words, when there is precipitation, the thermal image 200 may not produce as much contrast, that is, the thermal image 200 may be more homogenous that the thermal image 150, represented by histogram 170, where the atmospheric condition is clear, or no precipitation.

A change in contrast may be considered as a thermal image data characteristic that may be used to indicate a particular atmospheric condition such as precipitation or other atmospheric conditions. The thermal images and corresponding histograms shown in FIGS. 2-5 are simplified for purposes of illustration. The thermal images may involve a wide range of colors to represent the IR spectrum emitted from the scene observed in the field of view by the LWIR camera(s). The histogram corresponding to the thermal image may involve a continuous curve representing the IR spectrum of the thermal image instead of the discrete bars shown in the simplified versions in FIGS. 3 and 5.

While the examples shown in FIGS. 2-5 involve thermal images 150 and 200 that include the same scene with the same field of view and the same objects to simplify the illustration, in some examples, the atmospheric condition detection system 102 may use thermal image data from different scenes and/or different fields of view. In some examples, the system 102 may use characteristics of thermal images of individual objects that are similar, such as being in the same classification. Machine learning may be used to classify objects. Some examples of classifications of objects used by the system 102 may include: other vehicles, people, buildings, signs, the sky, the ground, a road surface, and/or others.

Figure 6:
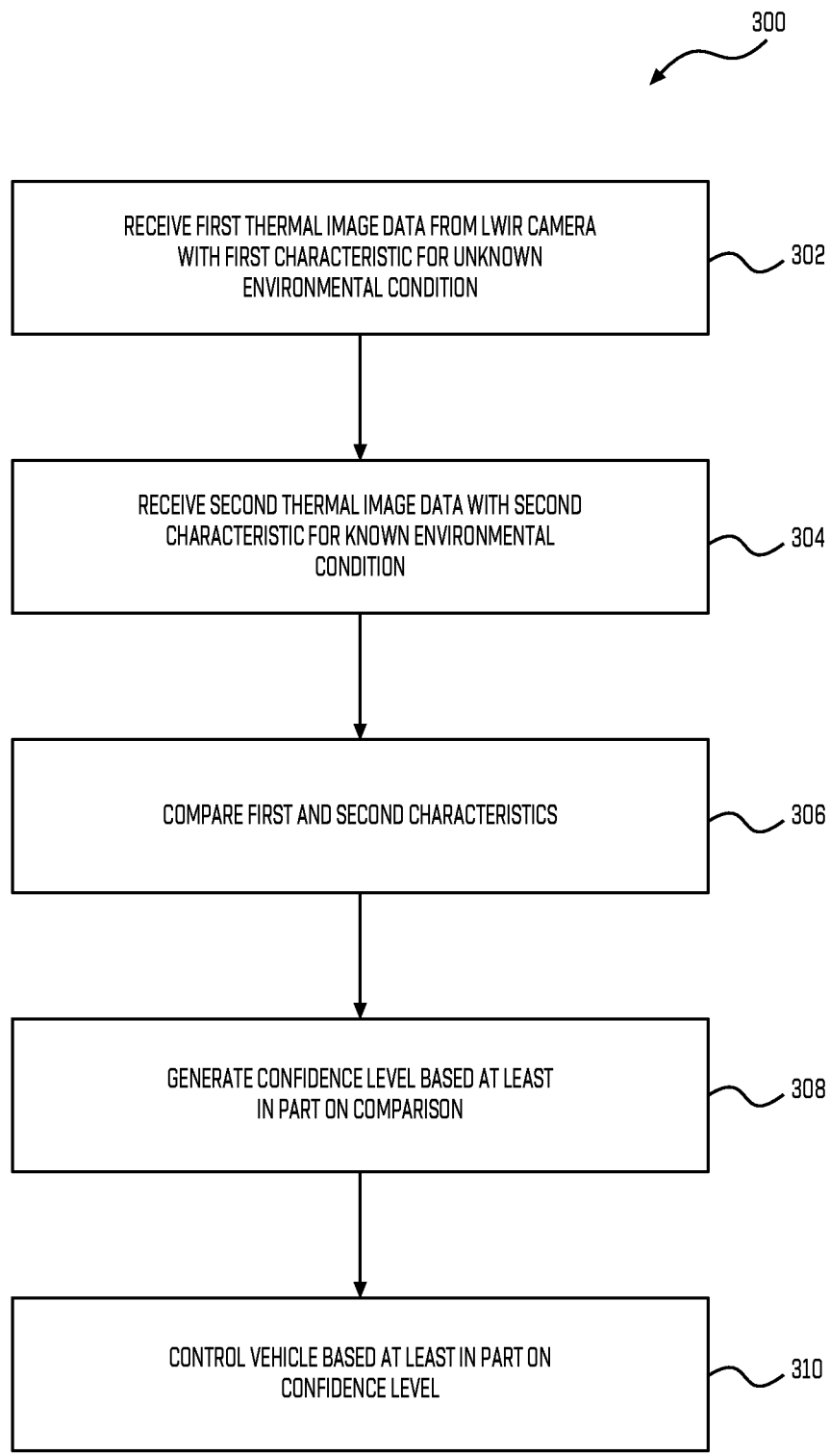
FIG. 6 is a flow diagram illustrating an example process associated with determining an unknown atmospheric condition and controlling the vehicle shown in FIG. 1 based on a confidence level of that determination, according to at least one example.

FIG. 6 is a flow diagram 300 illustrating an example process associated with determining an unknown atmospheric condition and controlling the vehicle 100 based on a confidence level of that determination. At 302 a first thermal image data may be received from the LWIR camera. The first thermal image data may be from a field of view of the LWIR camera that includes an unknown atmospheric condition and the first thermal image data may include a first characteristic. At 304 a second thermal image data is received for a field of view that includes a second characteristic for a known atmospheric condition. In some examples, the second thermal image data may be or may include a processed image that may be received from a database of processed images. At 306 the first characteristic and the second characteristic are compared to one another. At 308 a confidence level is generated based at least in part on the comparison. The confidence level may relate to a probability of the unknown atmospheric condition is a particular atmospheric condition. At 310 a vehicle is controlled based at least in part on the confidence level generated.

The computing device 132 of the system 102 may receive the first thermal image data from the LWIR system 120 which may include one or more LWIR camera 124 which may include one or more LWIR sensors. The thermal image data may be received by the one or more processors 134 which may process the thermal image data. In some examples, the LWIR system 120 may include processing capabilities to process data from the LWIR sensor(s) and to send the thermal image data to the one or more processors 132. In some examples, the thermal image data from the LWIR camera 124 may be sent to the one or more processors 132 and the LWIR camera 124 may be the LWIR system 120. In some examples, the LWIR system 120 may be part of a navigation or other vehicle system.

The one or more processors 134 of the computing device 132 may receive the second thermal image data from a memory which may include the non-volatile computer readable medium 136. The one or more processors 134 may generate the values related to the thermal image data characteristics of the thermal image data received and may compare the values to generate a confidence level related to the probability that the unknown atmospheric or atmospheric condition is a particular or known atmospheric or atmospheric condition. Of course, in some examples, such data characteristics may be stored as opposed to the image itself. Based at least in part on the confidence level, the computing device may provide data which may be used for controlling one or more aspect of vehicle control system 138.

In some examples, the first characteristic of the first thermal image data may be related to contrast of one or more objects observed in the field of view of the LWIR camera and the unknown atmospheric condition may be related to precipitation in the field of view. A reduction in visibility of a driver or a vehicle sensor system during precipitation may result from a reduction in contrast. In some examples the second characteristic of the second thermal image data may be related to contrast of one or more objects, that are in the same category of objects as those observed in the field of view of the LWIR camera, for a known atmospheric condition. In some examples, the object in the first and second thermal image data may be a person, another vehicle, a road, a sign, and/or other object. In some examples, the second thermal image data may be received from a memory, such as computer readable medium 136. In some examples, the first thermal image data does is not from the same field of view as the second thermal image data, but the first and second thermal image data includes data related to at least one object that is in the same classification in both the first and second thermal image data.

In some examples, the atmospheric condition may be rain, snow, clouds, ice, or sunshine. In some examples, the thermal image characteristic may involve contrast and/or brightness, the overall level of contrast and/or brightness related to the entire image or a part of the thermal image (e.g., a segmented portion—as may be segmented according to some semantic segmentation technique), the level of contrast and/or brightness related to one or more segment of the thermal image, the level of contrast and/or brightness of one or more objects in the thermal image, and/or other thermal image characteristic. In some examples, the vehicle may be controlled based at least in part on the thermal image characteristic. In some examples, a confidence level may be determined based at least in part on an estimate of the atmospheric condition which may be based at least in part on the thermal image characteristic. In some examples, the vehicle control may relate to steering, braking, speed, acceleration, passenger pickup and/or drop off, sensor(s) maintenance, sensor cleaning, windshield wiper control, cabin temperature control, electric vehicle motor control, electric vehicle battery control and/or other vehicle control related operations.

In some examples, the thermal image data may involve data that has been processed using machine learning to identify one or more object in the data. In some examples, the second thermal image data may include data that has been categorized based on object classification and/or atmospheric condition. In some examples, the first thermal image data may be processed using machine learning to identify one or more classification of object in the data and the vehicle system may receive the second thermal image data based on the identified one or more classification of objects in the first thermal image data (e.g., umbrellas, raincoats, mirrored thermal regions, etc.). In some examples, a machine learning algorithm that may be used to categorize objects and/or known atmospheric conditions may be trained using thermal image data having identified objects and/or known atmospheric conditions. In some examples, the machine learning algorithm may be trained using data that includes an association between atmospheric condition and characteristics in the thermal image data, which in some examples may include contrast.

In some examples, the system 102 may determine the confidence level of the unknown atmospheric condition being a particular atmospheric condition. In some examples, the confidence level may be based on a comparison of a contrast in the first thermal image data for a scene in the field of view of the LWIR camera and a contrast in the second thermal image data that is received from memory for a scene that includes an object in a classification that is the same as an object in the first thermal image data. In some examples, when the contrast in the first and second thermal image data is similar, then the confidence level is high that the unknown atmospheric condition is the same as the known atmospheric condition. In some examples, a high confidence level is a greater than 50% possibility that the unknown atmospheric condition is the same as the known atmospheric condition.

In another example, referring back to FIG. 4, a thermal image data characteristic which may be used to indicate precipitation or another atmospheric condition may involve the ghost image reflection 202 of the heat from the engine of the vehicle 106 off of the wet surface of the road 104. The ghost image reflection 202 may be in a frequency range that is not in the visible spectrum, but may show up in the thermal image data as a mirror image representation of the infrared radiation from the combustion engine, exhaust or other heat source of the vehicle 106. These mirror image reflections, or ghost image reflections may be indicative of an atmospheric condition such as rain, snow and/or ice on the road 104.

Figure 7:
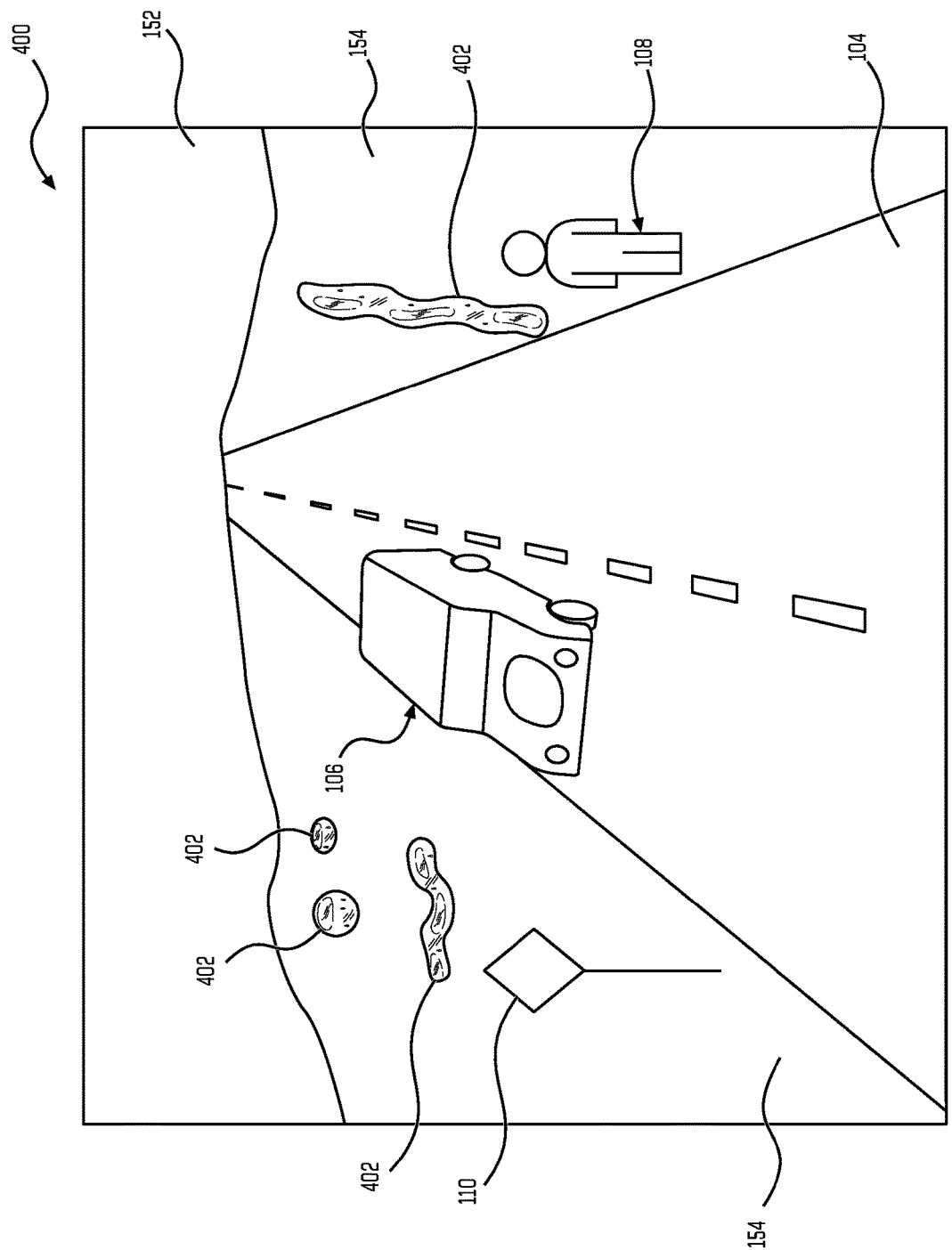
FIG. 7 is a depiction of an example of Red-Green-Blue image data for a field of view that includes an RGB image data characteristic for the environment shown in FIG. 1, according to at least one example.

FIG. 7 is a depiction of a camera data 400 for an image in a field of view that includes a camera data characteristic 402 for an atmosphere experiencing rain, such as the atmosphere 112 shown in FIG. 1. In some examples, the camera data may be from an RGB camera. Camera data 400 may be produced by one or more of the cameras 126 of a camera system 122. The camera system 122 may be part of a vehicle system that is otherwise used for navigating the vehicle 100. The camera data 400 may include the field of view 130 which may include at least part of the field of view 128 of the LWIR camera 124. The camera data characteristic 402 may include distortions in the image caused by rain drops or rain running on a lens of the camera 126. Camera data may be generated for known atmospheric conditions, such as data known to be collected when there was no rain. The camera data may be collected from the camera during operation of the vehicle 100 during an unknown atmospheric condition.

In some examples, the camera data 400 may be a first camera data and may be received from the camera 126 at the computing device 132. The first camera data may be from the field of view 130 of the camera 126. The first camera data may include a first camera data characteristic, which may be camera data characteristic 402. A second camera data may be received by the computing device 132 for a field of view that includes a second camera data characteristic and which includes a known atmospheric condition. In some examples, the second camera data characteristic may be a lack of rain distortions on the lens of the camera, and the known atmospheric condition may be lack of precipitation. In some examples, the second camera data may be or may include a processed image that may be received from a database of processed images. The computing device 132 may compare the first and second camera data characteristic and may generate the confidence level based in part on the comparison of the first and second camera data characteristic.

In some examples, the camera data characteristic may be used along with the thermal image characteristic to make a determination related to an estimate of the atmospheric condition. In some examples, the camera data characteristic and thermal image characteristic may be used for determining a confidence level associated with an estimated atmospheric condition. In some examples, if the camera data characteristic and the thermal image characteristic are indicative of the same atmospheric condition, then the confidence level may be relatively higher than if they are indicative of different atmospheric conditions. For example, if the camera data characteristic indicates that it is raining, and the thermal image characteristic also indicates that it is raining, then the confidence level may be higher than if the camera data characteristic indicates that it is raining and the thermal image characteristic indicates that it is not raining.

Figure 8:
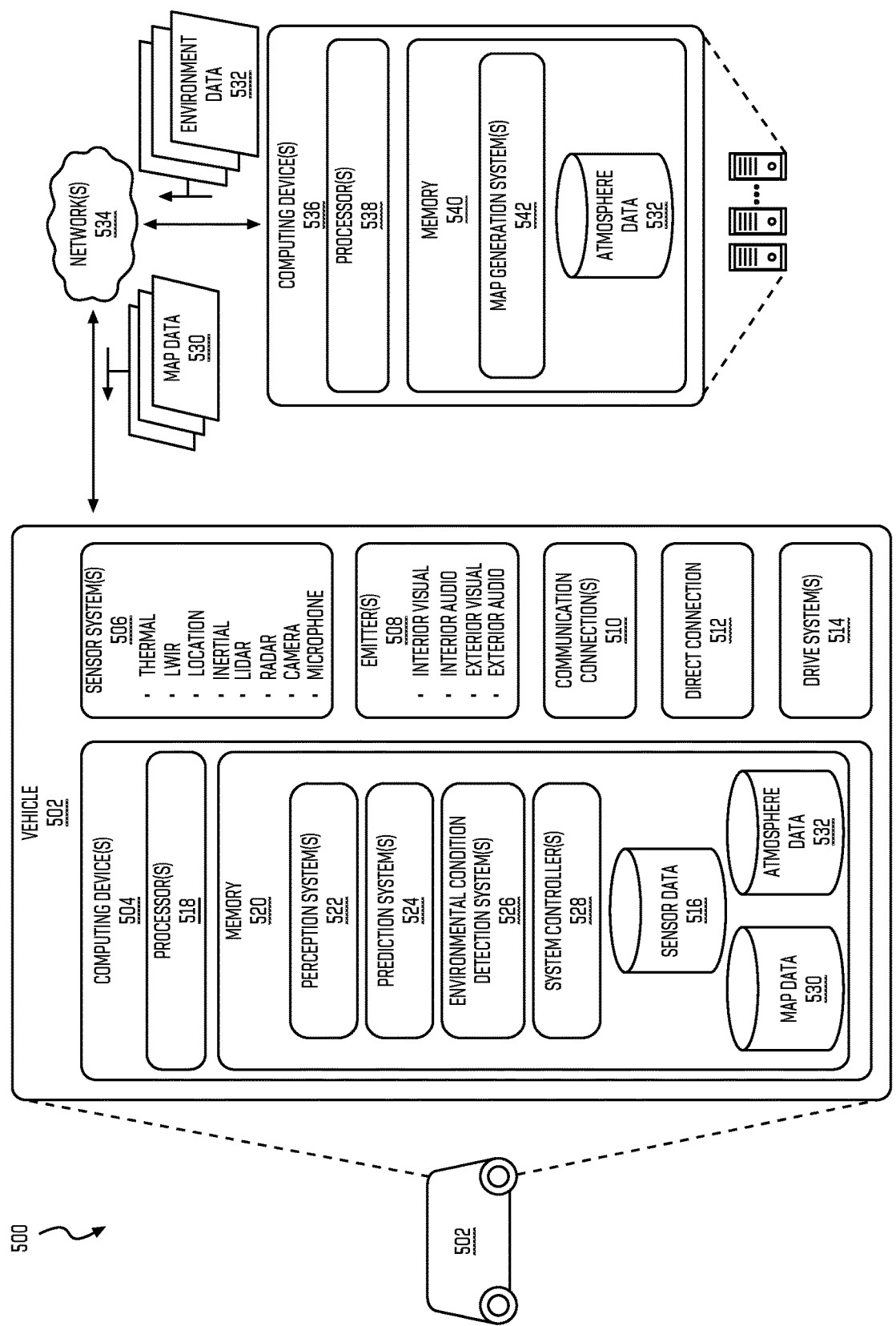
FIG. 8 depicts a block diagram of an example vehicle system 500 for implementing the techniques discussed herein.

FIG. 8 depicts a block diagram of an example vehicle system 500 for implementing the techniques discussed herein. In at least one example, the system 500 may include a vehicle 502, such the autonomous vehicles discussed above. The vehicle 502 may include computing device(s) 504, one or more sensor system(s) 506 (such as an thermal sensor system discussed above), one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 may be configured to capture the sensor data 516 associated with a surrounding physical environment.

In at least some examples, the sensor system(s) 506 may include thermal sensors (e.g., LWIR sensors, such as LWIR camera 124), time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., visible, RGB, such as RGB camera 126, IR, intensity, depth, etc.), microphone sensors, atmospheric sensors, (e.g., temperature sensors, humidity sensors, light sensors, pressure sensors, etc.), ultrasonic transducers, wheel encoders, etc. In some examples, the sensor system(s) 506 may include multiple instances of each type of sensors. For instance, time-of-flight sensors may include individual time-of-flight sensors located at the corners, front, back, sides, and/or top of the vehicle 502. As another example, camera sensors may include multiple cameras disposed at various locations about the exterior and/or interior of the vehicle 502. In some cases, the sensor system(s) 506 may provide input to the computing device(s) 504. In some examples, the vehicle control based at least in part on the thermal image data characteristic may relate to maintaining and/or cleaning one or more sensor. In some examples, the vehicle control may relate to cleaning water or particles from a camera or sensor lens.

The vehicle 502 may also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology. In some examples, vehicle control that is based at least in part on the thermal image characteristic may relate to controlling lights, screens, or other emitter(s). For example, the vehicle may control the lights to come on, or to go off, and/or the screens to brighten or darken.

The vehicle 502 can also include one or more communication connection(s) 510 that enable communication between the vehicle 502 and one or more other local or remote computing device(s) (e.g., a remote teleoperations computing device) or remote services. For instance, the communication connection(s) 510 can facilitate communication with other local computing device(s) on the vehicle 502 and/or the drive system(s) 514. Also, the communication connection(s) 510 may allow the vehicle 502 to communicate with other nearby computing device(s) (e.g., other nearby vehicles, traffic signals, etc.).

The communications connection(s) 510 may include physical and/or logical interfaces for connecting the computing device(s) 504 to another computing device or one or more external network(s) 534 (e.g., the Internet). For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 510 may comprise the one or more modems as described in detail above.

In at least one example, the vehicle 502 may include one or more drive system(s) 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) 506 on the drive system(s) 514 can overlap or supplement corresponding systems of the vehicle 502 (e.g., sensor system(s) 506). In some examples, the vehicle control that is based at least in part on the thermal image characteristic may relate to adjusting the operation of the drive system(s) to maintain traction.

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which may receive and preprocess data from the sensor system(s) 506 and to control operation of the various vehicle systems. In some examples, the drive system controller can include one or more processor(s) and memory communicatively coupled with the one or more processor(s). The memory can store one or more modules to perform various functionalities of the drive system(s) 514. Furthermore, the drive system(s) 514 also include one or more communication connection(s) that enable communication by the respective drive system with one or more other local or remote computing device(s). In some examples, the vehicle control that is based at least in part on the thermal image characteristic may relate to the operation of the stability control system during braking to mitigate loss of traction and to maintain control. In some examples, the vehicle control may relate to controlling the vehicle for passenger safety and/or comfort, such as by controlling the vehicle to avoid splashing passengers and/or pedestrians, when picking them up or dropping them off. In some examples, the vehicle control may relate to battery control to optimize battery discharge.

The computing device(s) 504, such as computing device 132, may include one or more processors 518, such as one or more processors 134, and one or more memories 520, such as memories 136, communicatively coupled with the processor(s) 518. In the illustrated example, the memory 520 of the computing device(s) 504 perception systems(s) 522, prediction systems(s) 524, atmospheric condition detection systems(s) 526, as well as one or more system controller(s) 528. The memory 520 may also store data such as sensor data 516 captured or collected by the one or more sensors systems 506, map data 530 and atmosphere data 532, which may include data used by the atmospheric condition detection system(s) 526. Though depicted as residing in the memory 520 for illustrative purposes, it is contemplated that the perception systems(s) 522, prediction systems(s) 524, atmospheric condition detection systems(s) 526, as well as one or more system controller(s) 528 may additionally, or alternatively, be accessible to the computing device(s) 504 (e.g., stored in a different component of vehicle 502 and/or be accessible to the vehicle 502 (e.g., stored remotely).

The perception system 522 may be configured to perform object detection, segmentation, and/or classification on the sensor data 516, such as the thermal sensor data and/or the visible sensor data as discussed above. In some examples, the perception system 522 may generate processed perception data from the sensor data 516. The perception data may indicate a presence of objects that are in physical proximity to the vehicle 502 and/or a classification or type of the objects (e.g., car, pedestrian, cyclist, building, tree, road surface, curb, sidewalk, unknown, etc.). In additional and/or alternative examples, the perception system 522 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the atmosphere may include, but are not limited to, a presence of another object, a time of day, a weather condition, a geographic position, an indication of darkness/light, etc. For example, details of classification and/or segmentation associated with a perception system are discussed in U.S. Pat. No. 10,535,138, which is incorporated herein by reference in entirety.

The prediction system 524 may be configured to determine a track corresponding to an object identified by the perception system 522. For example, the prediction system 524 may be configured to predict a velocity, position, change in trajectory, or otherwise predict the decisions and movement of the identified objects. For example, the prediction system 524 may include one or more machine learned models that may, based on inputs such as object type or classification and object characteristics, output predicted characteristics of the object at one or more future points in time. For example, details of predictions systems are discussed in U.S. Pat. Nos. 11,188,082 and 11,195,418, which are herein incorporated by reference in their entirety.

In at least one example, the computing device(s) 504 may store one or more and/or system controllers 528, which may be configured to control steering, propulsion, braking, safety, emitters, communication, and other systems of the vehicle 502. The system controllers 528 may communicate with and/or control corresponding systems of the drive system(s) 514 and/or other components of the vehicle 502, which may be configured to operate in accordance with a route provided from a planning system.

In some implementations, the vehicle 502 may connect to computing device(s) 536 via the network(s) 534. For example, the computing device(s) 536 may generate and provide the map data 530 and/or the atmosphere data 532 to the vehicle 502. In some examples, the atmospheric data 532 may include weather forecast information, which may be real-time. In some examples, the atmospheric data 532 may include machine learning model data which may be used to perform to perform on-the-field atmosphere detection. The computing device 536 may include one or more processor(s) 538 and memory 540 communicatively coupled with the one or more processor(s) 538. In at least one instance, the processor(s) 538 may be similar to the processor(s) 518 and the memory 540 may be similar to the memory 520. In the illustrated example, the memory 540 of the computing device(s) 536 stores the map data 530 and the atmosphere data 532. The memory 540 may also store a map generation system 542 to assist with compiling and generating the map data 530.

The processor(s) 518 of the computing device(s) 504 and the processor(s) 538 of the computing device(s) 536 may be any suitable processor capable of executing instructions to process data and perform operations as described herein. By way of example and not limitation, the processor(s) 518 and 538 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 520 of the computing device(s) 504 and the memory 540 of the computing device(s) 536 are examples of non-transitory computer-readable media. The memory 520 and 540 can store an operating system and one or more software applications, instructions, programs, and/or data to implement the methods described herein and the functions attributed to the various systems. In various implementations, the memory 520 and 540 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. In some instances, aspects of some or all of the components discussed herein can include any models, algorithms, and/or machine learning algorithms. For example, in some instances, the components in the memory 520 and 540 can be implemented as a neural network.

CONCLUSION

While one or more examples of the techniques described herein have been described, various alterations, additions, permutations and equivalents thereof are included within the scope of the techniques described herein. In some examples, the thermal image data characteristic may be referred to the thermal image characteristic. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 8 may utilize the processes and flows of FIGS. 1-7.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A. A vehicle comprising:
a long wave infrared (LWIR) sensor;
at least one processor; and
computer-readable instructions that, when executed by the at least one processor, cause the at least one processor to perform the operations comprising:
receiving thermal image data from the LWIR sensor, the thermal image data comprising a representation of an object in an environment with the vehicle
determining, based at least in part on the thermal image data, a thermal image data characteristic;

comparing the thermal image data characteristic to a previously determined thermal image data characteristic associated with a known atmospheric condition;

determining, based at least in part on the comparison, an estimated atmospheric condition;

determining, based at least in part on the comparison, a confidence level associated with the estimated atmospheric condition; and controlling the vehicle based at least in part on the confidence level.

B. The vehicle of clause A, wherein the vehicle further comprises a camera, and wherein the acts performed by the at least one processor includes:

receiving camera data from the camera; and determining a camera data characteristic, wherein determining the estimated atmospheric condition is further based at least in part on the camera data characteristic.

C. The vehicle system of clause B, wherein the camera data characteristic is indicative of water on a lens of the camera.

D. The vehicle system of clause A, wherein determining the thermal image data characteristic comprises:

inputting, into a machine learned model, the thermal image data; and receiving, from the machine learned model, the thermal image data characteristic.

E. The vehicle system of any one of clauses A-D, wherein the thermal image data includes infrared radiation information and the thermal image data characteristic comprises a level of contrast in the thermal image data.

F. A method comprising:

receiving thermal image data from an infrared camera;

determining, based at least in part on the thermal image data, a thermal characteristic;

determining, based at least on the thermal characteristic, an estimated atmospheric condition;

determining a confidence level associated with the estimated atmospheric condition; and controlling a vehicle based at least in part on the estimated atmospheric condition and the confidence level.

G. The method of clause F, wherein:

determining the thermal characteristic comprises determining a level of contrast of the thermal image data, determining the estimated atmospheric condition comprises comparing the level of contrast with a stored level of contrast associated with a known atmospheric condition, and determining the confidence level comprises determining a similarity between the level of contrast and the stored level of contrast.

H. The method of any of clauses F-G, wherein the estimated atmospheric condition comprises one or more of:
rain,
snow,
clouds,
ice, or
sunshine.

I. The method of clauses F-H, wherein the thermal characteristic comprises an indication of a portion of the thermal image data being mirrored within the thermal image data.

J. The method of clauses F-I, the method further comprising:

detecting, based at least in part on the thermal image data, an object represented in the thermal image data, wherein determining one or more of the estimated atmospheric condition or the confidence level is based at least in part on the object.

K. The method of clause J, wherein the object comprises one or more of:
a person,
a raincoat,
a jacket, or
an umbrella.

L. The method of any of clauses J-K, wherein determining the estimated atmospheric condition is based on the portion of the thermal image data associated with the object.

M. The method of any of clauses F-L, comprising:

receiving image data from a camera; and determining, based at least in part on the image data, an image data characteristic, wherein determining one or more of the estimated atmospheric condition or the confidence level is further based at least in part on the image data characteristic.

N. The method of clause M, wherein the image data characteristic is indicative of rain on a lens of the camera.

O. The method of any of clauses F-N, wherein determining one or more of the estimated atmospheric condition or the confidence level comprises:

inputting, into a machine learned model, the thermal data and the image data; and receiving, from the machine learned model, one or more of the estimated atmospheric condition or the confidence level.

P. The method of any of clauses F-P, wherein determining one or more of the thermal data characteristic, the estimated atmospheric condition, or the confidence level comprises:

inputting the thermal data into a machine learned model; and receiving, from the machine learned model, one or more of the thermal data characteristic, the estimated atmospheric condition, or the confidence level.

Q. A vehicle system comprising:

at least one processor; and computer readable instructions that, when executed by the at least one processor, cause the at least one processor to perform the operations comprising:

receiving thermal image data from a long wave infrared (LWIR) sensor, the thermal image data comprising a representation of an object in an environment of a vehicle;

determining, based at least in part on the thermal image data, a thermal image data characteristic;

comparing the thermal image data characteristic to a previously determined thermal image data characteristic associated with a known atmospheric condition;

determining, based at least on the comparison, an estimated atmospheric condition; and controlling the vehicle based at least in part on the estimated atmospheric condition.

R. The vehicle system of clause Q, wherein the thermal image data includes infrared radiation information and the thermal image data characteristic comprises a level of contrast in the thermal image data.

S. The vehicle system of any of clauses Q-R, wherein the thermal image data characteristic comprises an indication of a portion of the thermal image data being mirrored within the thermal image data.

T. The vehicle system of any of clauses Q-S, wherein the computer readable instruction cause the at least one processor to perform additional operations comprising:

receiving camera data from a camera;

determining a camera data characteristic; and wherein determining the atmospheric condition is further based at least in part on the camera data characteristic.

What is claimed is:

1. A vehicle comprising:

a long wave infrared (LWIR) sensor;

at least one processor; and computer-readable instructions that, when executed by the at least one processor, cause the at least one processor to perform the operations comprising:

receiving thermal image data from the LWIR sensor, the thermal image data comprising a representation of an object in an environment with the vehicle determining, based at least in part on the thermal image data, a thermal image data characteristic, the thermal image data characteristic comprising an intensity distribution associated with the thermal image data;

comparing the thermal image data characteristic to a previously determined thermal image data characteristic associated with a known atmospheric condition, the previously determined thermal image data characteristic comprising an additional intensity distribution associated with the known atmospheric condition;

determining, based at least in part on the comparison, an estimated atmospheric condition;

determining, based at least in part on the comparison, a confidence level associated with the estimated atmospheric condition; and controlling the vehicle based at least in part on the confidence level.

2. The vehicle of claim 1, wherein the vehicle further comprises a camera, and wherein the acts performed by the at least one processor includes:

receiving camera data from the camera; and determining a camera data characteristic, wherein determining the estimated atmospheric condition is further based at least in part on the camera data characteristic.

3. The vehicle system of claim 2, wherein the camera data characteristic is indicative of water on a lens of the camera.

4. The vehicle system of claim 1, wherein determining the thermal image data characteristic comprises:

inputting, into a machine learned model, the thermal image data; and receiving, from the machine learned model, the thermal image data characteristic.

5. The vehicle system of claim 1, wherein the thermal image data includes infrared radiation information and the thermal image data characteristic comprises a level of contrast in the thermal image data.

6. A method comprising:

receiving thermal image data from an infrared camera;

determining, based at least in part on the thermal image data, a thermal characteristic, the thermal characteristic comprising an intensity distribution associated with the thermal image data;

determining, based at least on the thermal characteristic and on a previously determined thermal characteristic associated with a known atmospheric condition, an estimated atmospheric condition, the previously determined thermal characteristic comprising an additional intensity distribution associated with the known atmospheric condition;

determining a confidence level associated with the estimated atmospheric condition; and controlling a vehicle based at least in part on the estimated atmospheric condition and the confidence level.

7. The method of claim 6, wherein:

determining the thermal characteristic comprises determining a level of contrast of the thermal image data, determining the estimated atmospheric condition comprises comparing the level of contrast with a stored level of contrast associated with a known atmospheric condition, and determining the confidence level comprises determining a similarity between the level of contrast and the stored level of contrast.

8. The method of claim 6, wherein the estimated atmospheric condition comprises one or more of:

rain, snow, clouds, ice, or sunshine.

9. The method of claim 6, wherein the thermal characteristic comprises an indication of a portion of the thermal image data being mirrored within the thermal image data.

10. The method of claim 6, the method further comprising:

detecting, based at least in part on the thermal image data, an object represented in the thermal image data, wherein determining one or more of the estimated atmospheric condition or the confidence level is based at least in part on the object.

11. The method of claim 10, wherein the object comprises one or more of:

a person, a raincoat, a jacket, or an umbrella.

12. The method of claim 10, wherein determining the estimated atmospheric condition is based on the portion of the thermal image data associated with the object.

13. The method of claim 6, comprising:

receiving image data from a camera; and determining, based at least in part on the image data, an image data characteristic, wherein determining one or more of the estimated atmospheric condition or the confidence level is further based at least in part on the image data characteristic.

14. The method of claim 13, wherein the image data characteristic is indicative of rain on a lens of the camera.

15. The method of claim 13, wherein determining one or more of the estimated atmospheric condition or the confidence level comprises:

inputting, into a machine learned model, the thermal data and the image data; and receiving, from the machine learned model, one or more of the estimated atmospheric condition or the confidence level.

16. The method of claim 6, wherein determining one or more of the thermal data characteristic, the estimated atmospheric condition, or the confidence level comprises:

inputting the thermal data into a machine learned model; and receiving, from the machine learned model, one or more of the thermal data characteristic, the estimated atmospheric condition, or the confidence level.

17. A vehicle system comprising:
at least one processor; and
computer readable instructions that, when executed by the at least one processor, cause the at least one processor to perform the operations comprising:
   receiving thermal image data from a long wave infrared (LWIR) sensor, the thermal image data comprising a representation of an object in an environment of a vehicle;
   determining, based at least in part on the thermal image data, a thermal image data characteristic, the thermal image data characteristic comprising an intensity distribution associated with the thermal image data;
   comparing the thermal image data characteristic to a previously determined thermal image data characteristic associated with a known atmospheric condition, the previously determined thermal image data characteristic comprising an additional intensity distribution associated with the known atmospheric condition;
   determining, based at least on the comparison, an estimated atmospheric condition; and
   controlling the vehicle based at least in part on the estimated atmospheric condition.

18. The vehicle system of claim 17, wherein the thermal image data includes infrared radiation information and the thermal image data characteristic comprises a level of contrast in the thermal image data.

19. The vehicle system of claim 17, wherein the thermal image data characteristic comprises an indication of a portion of the thermal image data being mirrored within the thermal image data.

20. The vehicle system of claim 17, wherein the computer readable instruction cause the at least one processor to perform additional operations comprising:
   receiving camera data from a camera;
   determining a camera data characteristic; and
   wherein determining the atmospheric condition is further based at least in part on the camera data characteristic.

* * * * *